United States Patent
Li et al.

(10) Patent No.: US 11,997,721 B2
(45) Date of Patent: May 28, 2024

(54) COLLABORATIVE OPTIMIZATION OF RANDOM ACCESS CHANNEL CONFIGURATION IN WIRELESS NETWORK ACCESS NODES

(71) Applicant: ZTE Corporation, Guangdong (CN)

(72) Inventors: Dapeng Li, Guangdong (CN); Yin Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 329 days.

(21) Appl. No.: 17/480,991

(22) Filed: Sep. 21, 2021

(65) Prior Publication Data

US 2022/0007432 A1   Jan. 6, 2022

Related U.S. Application Data

(63) Continuation of application No. PCT/CN2019/080255, filed on Mar. 28, 2019.

(51) Int. Cl.
  *H04W 74/0833* (2024.01)
(52) U.S. Cl.
  CPC .............................. *H04W 74/0833* (2013.01)
(58) Field of Classification Search
  CPC ... H04W 72/21; H04W 28/06; H04W 52/267; H04W 72/51; H04W 74/0833; H04W 74/002; H04W 74/008; H04W 74/006; H04W 72/27
  See application file for complete search history.

(56) References Cited

U.S. PATENT DOCUMENTS

2010/0238831 A1* 9/2010 Jeong ................. H04W 28/06
                                                        370/252

FOREIGN PATENT DOCUMENTS

| CN | 101873712 A | 10/2010 |
| CN | 105848183 A | 8/2016 |
| CN | 106550426 A | 3/2017 |
| CN | 107135528 A | 9/2017 |
| CN | 109327327 A | 2/2019 |
| CN | 109327914 A | 2/2019 |
| WO | WO 2018/080362 A1 | 5/2018 |

OTHER PUBLICATIONS

International Search Report mailed Dec. 27, 2019 for International Application No. PCT/CN2019/080255.
First Office Action dated Apr. 29, 2023 in Chinese Patent Application No. 201980094557.7 with English translation (20 pages).

* cited by examiner

*Primary Examiner* — Dady Chery
(74) *Attorney, Agent, or Firm* — Crowell & Moring LLP

(57) ABSTRACT

This disclosure relates to collaborative optimization of random access channel configuration in wireless access networks. In one implementation, optimization of the random access channel configuration in one wireless access network node may be performed with assistance from other wireless network nodes by receiving operational parameters that may be relevant for random access channel configuration optimization but are not locally collected at the wireless access network node.

16 Claims, 12 Drawing Sheets

COLLABORATIVE OPTIMIZATION OF RANDOM ACCESS CHANNEL CONFIGURATION IN WIRELESS NETWORK ACCESS NODES

CROSS REFERENCE

This application is a continuation of and claims priority to International PCT Application No. PCT/CN2019/080255, filed on Mar. 28, 2019 with China Intellectual Property Office, which is herein incorporated by reference in its entirety.

TECHNICAL FIELD

This disclosure is directed generally to wireless communication network and particularly to random access channel configuration for wireless communication network nodes.

BACKGROUND

Wireless communication technologies are moving the world towards a rapidly increasing network connectivity. High-speed and low-latency wireless communications rely on efficient network resource management and allocation between user mobile stations and wireless access network nodes (including but not limited to wireless base stations). Unlike traditional circuit-switched networks, efficient wireless access networks may not rely on dedicated user channels, and wireless network resources (such and carrier frequencies and transmission time slots) for transmitting voice or other types of data from user mobile stations to wireless access network nodes may be allocated on a random access rather than fixed access basis.

SUMMARY

This disclosure relates to methods, systems, and devices for inter-node collaborative optimization of random access channel configuration for wireless access network nodes. Such collaboratively optimized random access channel configuration may facilitate contention-based random access by mobile stations.

In one embodiment, a method for providing random network access configuration to one or more mobile stations is disclose. The method may be performed at a first wireless access network node. The method may include receiving a message from a second wireless access network node; obtaining, based on the message, an optimized random access channel configuration for the first wireless access network node for reducing contention among the one or more mobile stations in obtaining network resource for random access to the first wireless access network node. The method may further include broadcasting the optimized random access channel configuration optimized for the first wireless access network node to the one or more mobile stations; and receiving a random access request generated by one of the one or more mobile stations and transmitted according to transmission parameters selected from a plurality of transmission parameters indicated in the optimized random access channel configuration.

In another embodiment, a method for assisting random network access channel configuration optimization of a second wireless access network node by a first wireless network access node is disclosed. The method may be performed by a first wireless access network node. The method may include generating a message comprising a dataset for random access channel configuration optimization for the second wireless access network node; and transmitting the message to a third wireless access network node. The dataset contained in the message may include one of an optimized random access channel configuration for the second wireless access network node; supplemental data for obtaining an optimized random access channel configuration for the second wireless access network node; an indicator for optimizing random access channel configuration for the second wireless access network node; a random access channel configuration of the first wireless access network node; or a random access channel configuration of a neighboring wireless access network node of the second wireless access network node relayed by the first wireless access network node.

In another embodiment, a method performed by a first wireless access network node is disclosed. The method include steps for providing random network access configuration to one or more mobile stations associated with a second wireless access network node and a third wireless access network node is disclosed. The method may include receiving a first message from the second wireless access network node; receiving a second message from the third wireless access network node; generating a third message based on the first message and the second message for optimization of random access channel configuration for the second wireless access network node; generating a fourth message based on the first message and the second message for optimization of random access channel configuration for the third wireless access network node. The method may further include transmitting the third message to the second wireless network access node to cause the second wireless network access node to update its random access channel configuration; and transmitting the fourth message to the third wireless network access node to cause the third wireless network access node to update its random access channel configuration.

In some other embodiments, a wireless access network node comprising a memory and a processor is disclosed. The wireless access network node may be configured to implement the above methods when computer instructions stored in the memory are executed by the processor.

In any one of the embodiments above, the wireless access network node may be any one of a 4G LTE base station, a 5G NR base station, a 5G central-unit base station, 5G distributed-unit base station, a 5G core station, or an application server. The wireless access network node may by other types of wireless stations. Each type of these wireless access network nodes may be configured to perform a corresponding set of wireless network functions. The sets of wireless network functions between different types of wireless access network nodes may not be identical. The set of wireless network functions between different types of wireless access network nodes, however, may functionally overlap, In any one of the embodiments above, a message between the wireless access network nodes may be transmitted and received via any one of an F1, Xn, and NG communication interface, or any other suitable communication interface. Each of these communication interface may be supported by a predefined network communication protocol stack. These communication interfaces may involve a wireless physical layer. However, these communication interfaces may also rely on wired physical layer. Different types wireless access network nodes may communicate among one another using a predetermined type of communication interface among the plurality of types of communication interface above. Communication between some types of wireless access network nodes may be direct. Communications between some types wireless access network nodes may be indirect may be relayed by another type of wireless access network nodes.

The above embodiments and other aspects and alternatives of their implementations are described in greater detail in the drawings, the descriptions, and the claims below.

DETAILED DESCRIPTION

Figure 1:
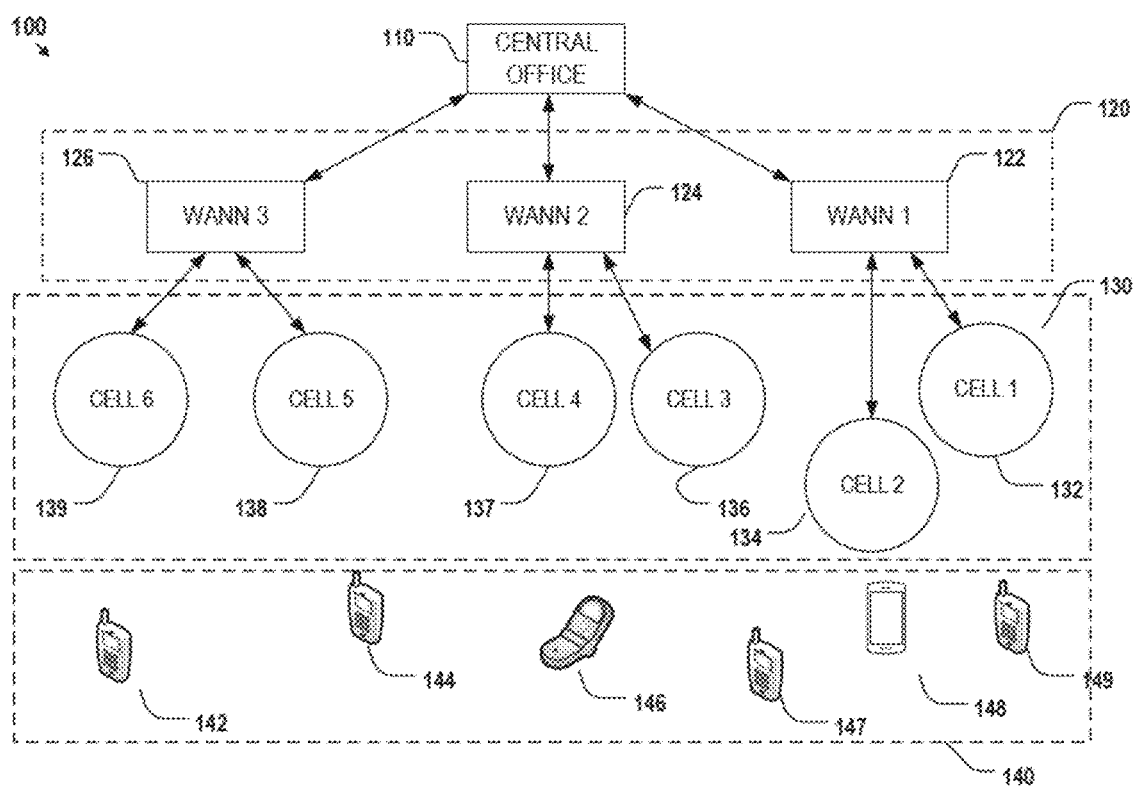
FIG. 1 shows an example of a wireless access network including a plurality of mobile stations, various wireless access network nodes, and a central office for aggregating the wireless access network into a core network.

Wireless access network provides network connectivity between user mobile stations and a core network. An example wireless access network may be based on cellular technologies. FIG. 1 shows an example of a wireless access network 100. The wireless access network 100 of FIG. 1 include central office 110, wireless access network nodes (WANNs) 120 and corresponding terrestrial cells 130, and user mobile stations 140 distributed within the terrestrial cells 130.

The central office 110 may be responsible for interfacing between the wireless access network 110 and a core network (not shown). The central office 110, for example, may be responsible for aggregating traffic from the user mobile stations 140 into the core network and for distributing traffic from the core network to the user mobile stations 140 via the WANNs 120. The WANNs 120, such as nodes 122, 124, and 126, may be alternatively referred to as base stations and are responsible for communicating wirelessly with the mobile stations 140. The WANNs 120 may be spatially distributed to provide ratio coverage of a predefined territory in units of cells 130. For example, WANN 122 may be associated with cells 132 and 134, whereas WANN 124 may be associated with cells 136 and 137, and WANN 126 may be associated with cells 138 and 139. Cells associated with the WANNs 120 may include neighboring cells. For example, cell 134 associated with WANN 122 may be adjacent to cell 136 associated with WANN 124, and cell 137 associated with WANN 124 may be adjacent to cell 138 associated with WANN 126. The user mobile stations 149 may include but are not limited to mobile phones, tablets, laptop computers, and other mobile devices shown as devices 142, 144, 146, 147, 148, and 149 in FIG. 1.

Figure 2:
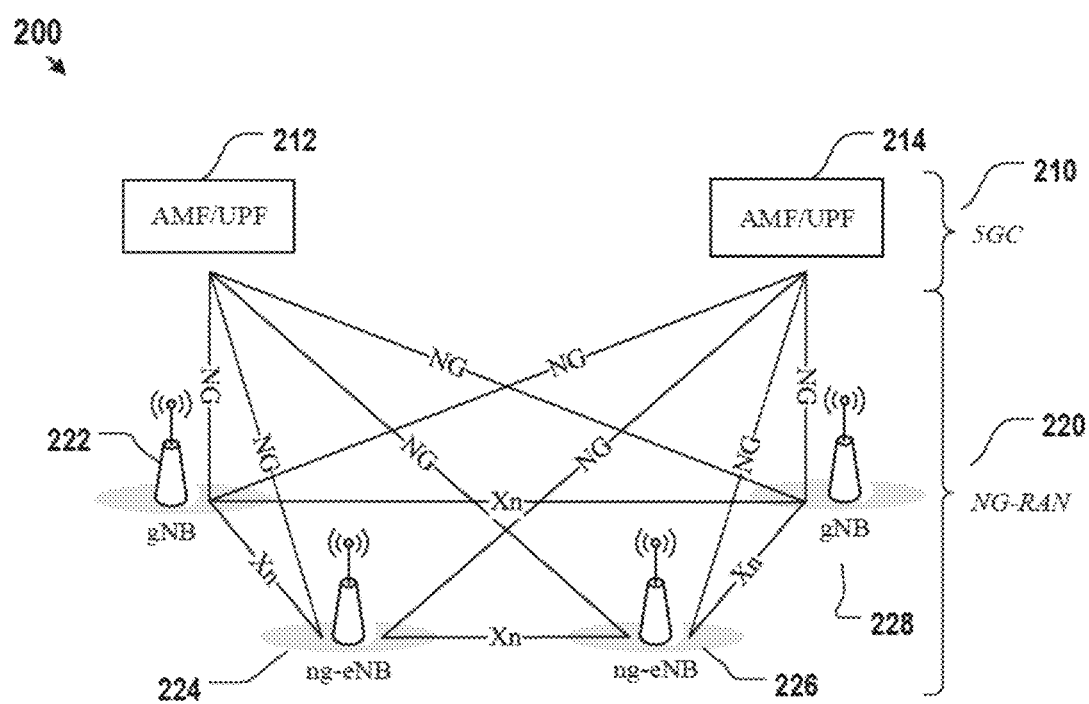
FIG. 2 shows an example of a 5G wireless access network with function splitting between new radio base stations, access and mobility function nodes, and user plane function nodes

Generations of implementations of the basic wireless access network of FIG. 1 has evolved towards higher speed, lower latency, wider coverage, improved flexibility, and higher efficiency. For example, FIG. 2 shows an example implementation 200 of the fifth generation 5G wireless access network. The 5G wireless access network 200 of FIG. 2 may include next-generation (NG) radio access network (RAN) 220 and 5G core (5GC) 210. The NG-RAN 220 may further include base stations 222 and 228 (labeled as gNB, representing WANNs that provide new radio (NR) user plane and control plane protocol terminations towards user mobile stations, or user equipment (UE)), and 224 and 226 (labeled as ng-eNB, representing WANNs that provide evolved universal terrestrial ratio access (E-UTRA) user plane and control plane protocol terminations towards UE). These WANNs communicate with one another using, for example, an Xn interface, as shown in FIG. 2. The 5GC 210 of the wireless access network 200 of FIG. 2 may further include wireless nodes 212 and 214 for controlling and provisioning access and mobility function (AMF) and user plane function (UPF). Nodes 212 and 214 may be considered another types of WANNs. As shown in FIG. 2, gNB and ng-eNB types of WANNs may communicate with the AMF/UPF types of WANNs via, for example, an NG communication interface. The wireless access network 200 of FIG. 2 thus provides a split-function implementation of WANNs in 5G wireless network with function splitting between gNB, ng-eNB, and AMF/UPF.

Figure 3:
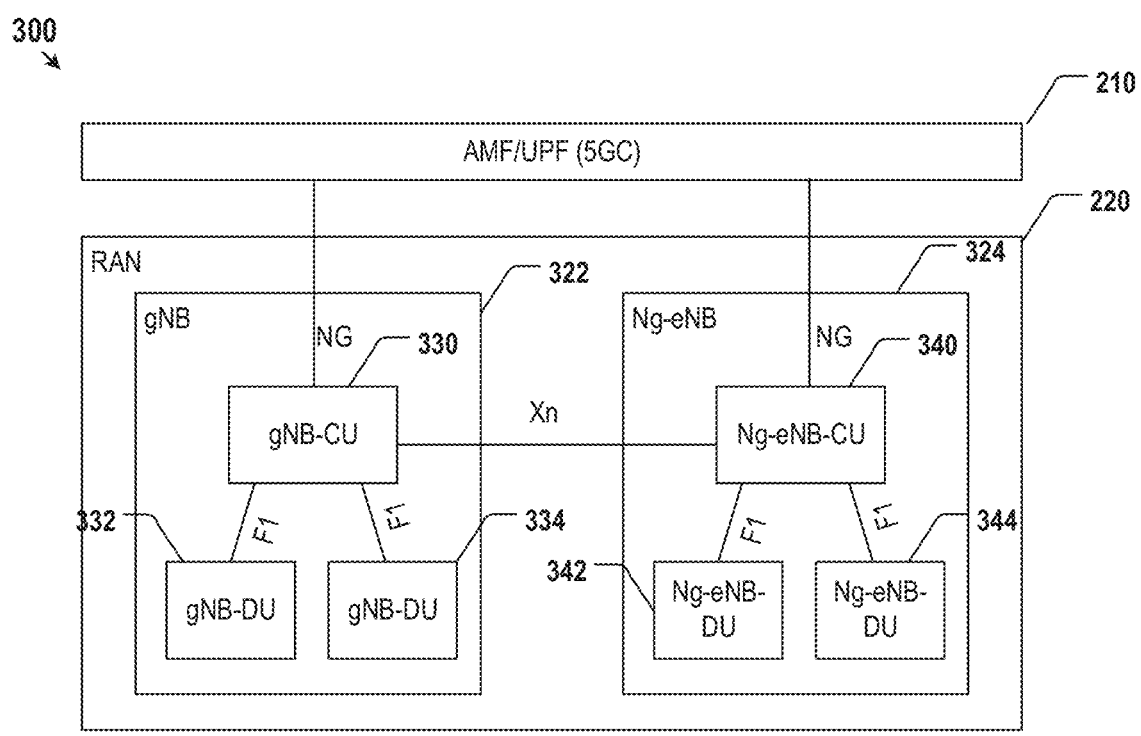
FIG. 3 shows an example of an additional function splitting of 5G base stations into central-unit new ratio base stations and distributed-unit base stations.

In some 5G wireless access networks, the WANNs of the RAN 220 in FIG. 2 may be further implemented with additional function splitting, as shown in the example 300 of FIG. 3. In particular, FIG. 3 shows that, in additional to the function spitting between the WANNs in 5GC 210 and WANNs in the RAN 220, some of the base stations, such as the gNB 322 or ng-eNB 324 may be further split into central units (CU) 330 and 340, and distributed units (DU) 332, 334, 342, and 344. For example, the gNB 322 may be split into multiple WANNs including gNB-CU 330, gNB-DU 332, and gNB-DU 334, whereas the ng-eNB 324 may likewise be split into multiple WANNs including gNB-CU 340, gNB-DU 342, and gNB-DU 344.

Each central unit WANN may be associated with one or more distributed unit WANNs, as shown in FIG. 3. The central unit WANNs of either the gNB type of the ng-eNB type may communicate with one another via the Xn interface, as indicated in FIG. 3 and described above. The distributed unit WANNs may each communicate with its corresponding central unit WANN via an exemplary F1 communication interface. For example, the distributed unit WANNs including gBN-DUs 332 and 334 may communicate with their central unit WANN of gNB-CU 330, whereas the distributed unit WANNs including ng-eBN-DUs 342 and 344 may communicate with their central unit WANN of ng-eNB-CU 340, both via the F1 communication interface. In some implementations and for reducing system complexity, the distributed unit WANNs may not communicate directly with one another.

The function splitting of 5G WANNs depicted in FIGS. 2 and 3 and described above is merely one of many examples. Function splitting of WANNs may be implemented in other forms and in other types or generations of wireless access networks.

Returning to FIG. 1, user mobile stations may be in communication with the WANNs 120 using wireless network communication resources allocated by the WANNs. Such wireless network communication resources may include but are not limited to radio frequency carrier frequencies and time slots. Unlike traditional circuit-switched communication system based on pre-assigned and dedicated communication channels, wireless access network may be more efficiently implemented using random access. In particular, a user mobile station may request access to network communication resources at random times and as needed. Random channel resources may be made available and assigned by the WANNs upon random access request by a user mobile station. In some implementations, requests for random access by the mobile stations and messages from the WANNs describing random access communication resources may be communicated via control channels. Random access communication resources that may be selected by user mobile stations may be included in random access channel configuration messages (or RACH configuration messages) generated by the WANNs. The RACH configuration messages may be broadcasted by the WANNs to the user mobile stations. A user mobile station may select a RACH among all RACHs that are available according a RACH configuration message for transmitting a random access request to the WANNs. The term "channel" is used herein to broadly refer to network transmission resources, including but not limited to any combination of transmission carrier frequencies and time slots.

Figure 4:
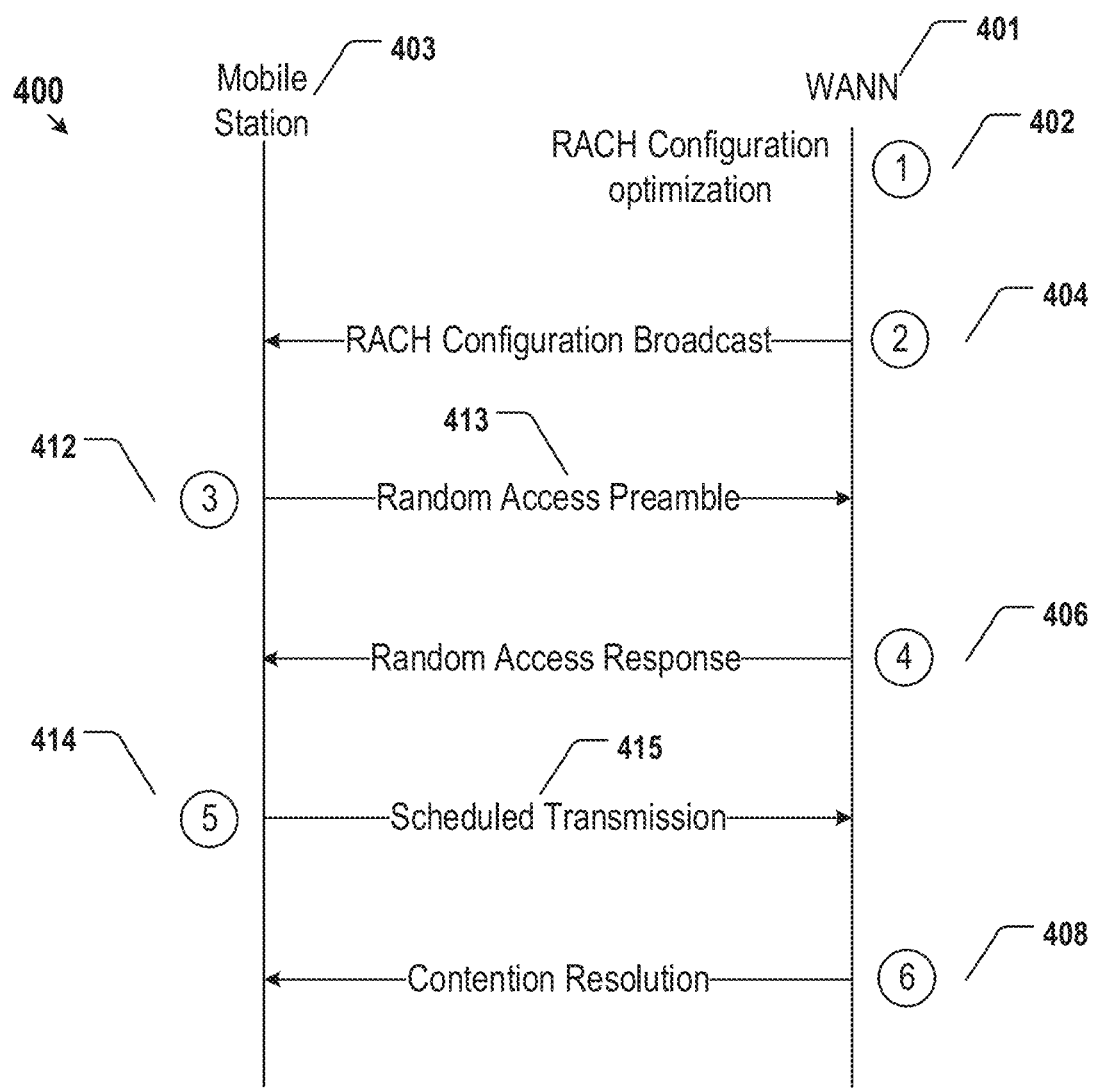
FIG. 4 shows an example of a random access procedure performed jointly by a mobile station and a wireless access network node.

FIG. 4 illustrates an example implementation of a user contention-based random access channel request and allocation procedure 400. The RACH procedure starts at step 1 (402) in which the WANN 401 performs optimization for RACH configuration to obtain an optimized RACH configuration. The optimization of the RACH configuration may involve designing RACH preambles according to various network operational parameters available at the WANN for optimizing RACH efficiency and for reducing potential contention among user mobile stations. Once the optimized RACH configuration is determined, the WANN may broadcast the optimized RACH configuration via, for example, a predetermined control channel. For example, the optimized RACH configuration may be broadcasted in step 2 (404) as part of the synchronization signal and physical broadcast channel block (SSB).

Continuing with FIG. 4 and at step 3 (412), the user mobile station 403 receives the optimized RACH configuration broadcasted by the MANN 401. The user mobile station then selects a random access preamble from the plurality of random access preambles indicated as available in the optimized RACH configuration and communicates the selection to the MANN, as shown by 413. The MANN receives the preamble selection from the user mobile station and provides response to the mobile station at step 4 (406). The response may include network resources allocated for the mobile station for transmission to the MANN. The mobile station receives the response at step 5 (414) and extracts the allocated network resources from the response. The mobile station then prepares its transmitter to schedule transmission and transmits information using the allocated network resources to the MANN, as shown by 415. The random access by the mobile station is then determined to be established if no network resource contention from other user mobile stations is present. Otherwise, the WANN proceeds to resolve the contention in step 6 (408) before the random access by the user mobile station 403 is either allowed to be established or disallowed to make the allocated network resources available to some other contending user mobile station.

In some implementations, the optimization of the RACH configuration at the WANN 401 in step 402 of FIG. 4 may be based on the network operation parameters available to the WANN 401. In some other implementations, the optimization of the RACH configuration at the WANN 401 may be performed in a collaborative manner. For example, the parameters used for performing optimization of the RACH configuration may not be limited to those directly available at the WANN 401. Rather, other WANNs may participate in providing other parameters that may facilitate more efficient optimization of the RACH configuration at the WANN 401. As such, the WANN 401 may collaborate with other WANNs for enhancing optimization of its RACH configuration before the optimized RACH configuration is broadcasted to its user mobile stations.

Figure 5:
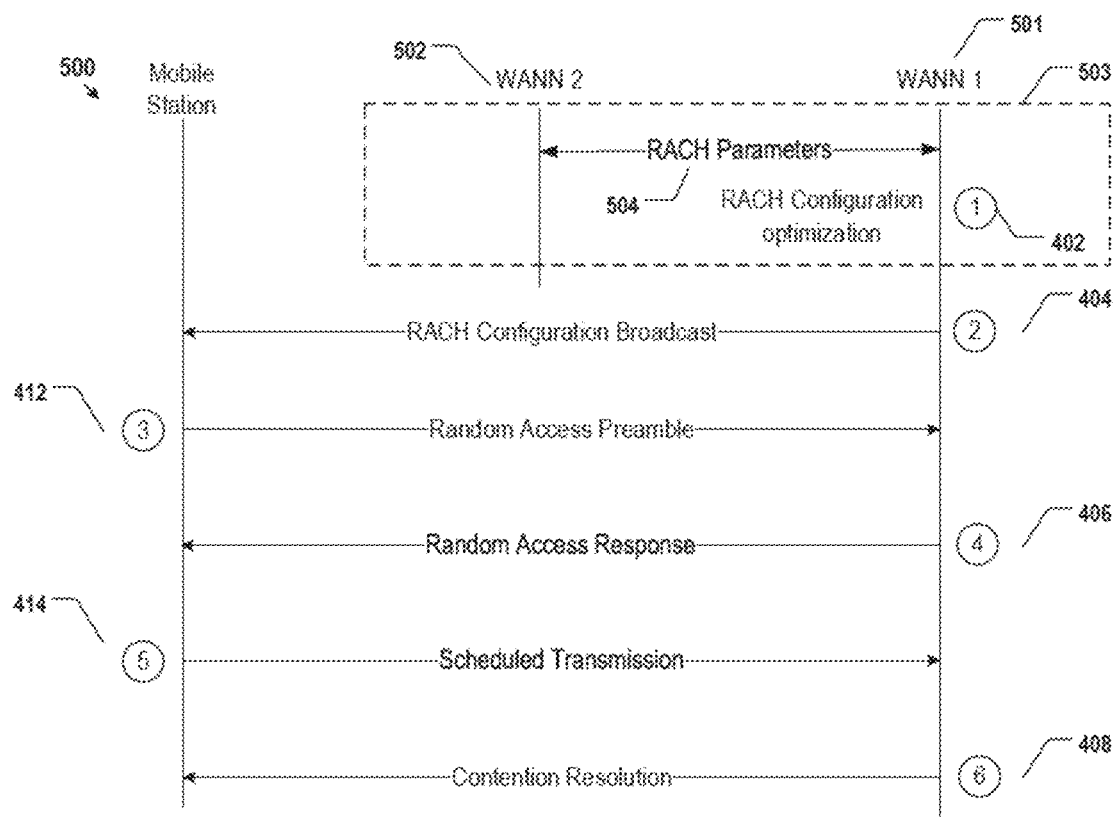
FIG. 5 shows an example a random access procedure in which the optimization of the random access channel configuration is performed jointly more than one wireless access network nodes.

An example for such a collaborative optimization of RACH configuration is shown in FIG. 5 in the context of the RACH request procedure of FIG. 4. As shown in FIG. 5, the RACH request procedure 500 may further include a collaborative optimization sub-procedure 503 for optimizing the RACH configuration at WANN1 501 (corresponding to WANN 401 of FIG. 4). The collaborative optimization sub-procedure 503 may involve one or more other WANNs, such as WANN 2 (502). In particularly, WANN1 (501) and other WANNs (such as WANN2, 502) may communicate with one another, as shown by arrow 504, to pass various network parameters available at each of the WANNs for use in optimizing the RACH configuration of WANN1 (501). While only one WANN (WANN2, 502) other than WANN1 (501) is depicted in FIG. 5, multiple other WANNs may participate in providing operational parameters and in the collaborative optimization procedure 503 for the RACH configuration of WANN1 (501).

The collaborative optimization of the RACH configuration in FIG. 5 utilizes operational data from multiple WANNs to assist in the RACH configuration optimization. In particular, operational parameters available locally in a first WANN for RACH configuration optimization of the first WANN may be limited. For example, different types of WANNs as described in FIGS. 2 and 3 may collect, monitor, and store different operational parameters, resulting in limited scope of network operational parameters available to each WANN. In some situations, operational parameters from a second WANN (such as a second WANN having neighboring cells with the first WANN) may be useful for determining optimal RACH configuration for the first WANN. In addition, optimal RACH configurations for different WANN may not always be in alignment. In other words, optimizing the RACH configuration for one WANN may inadvertently affect optimization of the RACH configuration for another WANN due to interaction and coupling between random access configurations of different WANNs. As such, in some implementations, optimization of RACH configurations may need to be considered at a network level rather than individual WANN levels. For these reasons, the collaborative implantation illustrated in FIG. 5 may facilitate RACH configuration optimization for a particular WANN considering parameters that are not local to the WANN and considering optimization of RACH configurations of other WANNs.

Various network operational parameters at a local WANN or other WANNs may be considered as factors in the collaborative RACH configuration optimization process. In a 5G system with function splitting discussed above with respect to central unit and distributed unit WANN in FIG. 3, example operational parameters that may be considered in the RACH configuration optimization are listed in Table I below.

only collected ant the central unit WANN. Some other parameters for the distributed unit WANNs, on the contrary, are only collected at the distributed unit WANN and are not locally available at the central unit WANN. These parameters, for example, may include the uplink inter-cell interference from the physical uplink shared channel (PUSCH), and PUSCH load.

As can be seen above, and within a central unit and corresponding distributed unit subsystem, parameters collected at the central unit WANN may be considered as a factor affecting RACH configuration optimization at a distributed unit WANN but may not be available locally at the distributed unit WANN. Similarly, parameters collected at the distributed unit WANN may be considered as a factor affecting RACH configuration optimization at the central unit WANN but may not be available locally at the central unit WANN. As such, the function splitting discussed above (with the 5G function splitting as an example) may create situations where collaborative optimization of RACH configuration optimization may be critical.

In the collaborative optimization process, parameters may be communicated among multiple WANNs of various types. The embodiments described below provides examples for implementing such collaborative optimization of RACH configuration.

Figure 6:
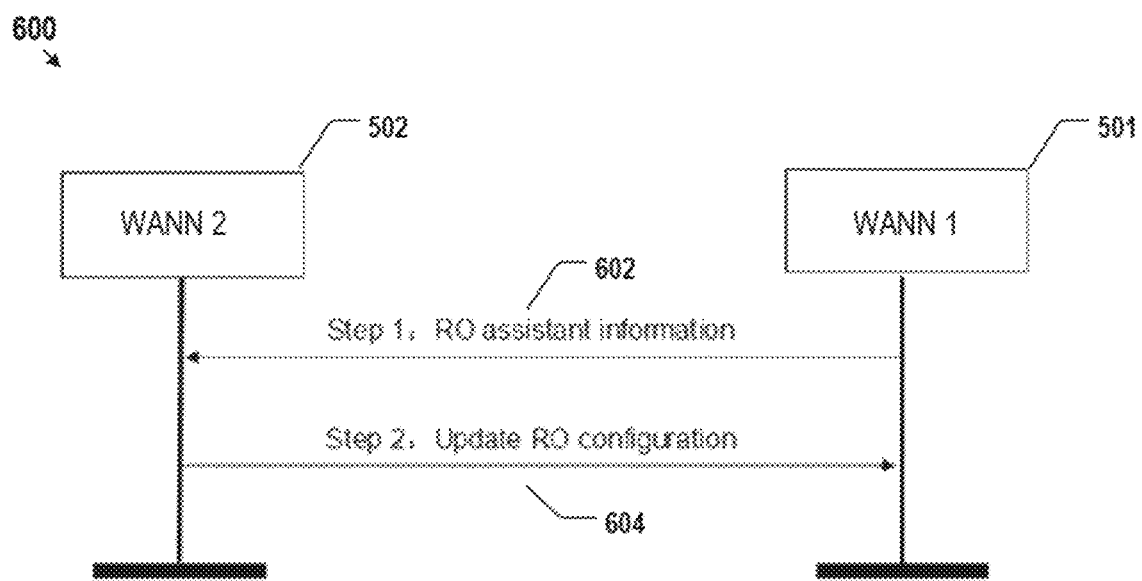
FIG. 6 shows an example of collaborative optimization of random access channel configuration involving two wireless access network nodes.

In a first example embodiment, as shown as 600 in FIG. 6, the RACH configuration optimization (RO) for WANN1 (501) may be performed by WANN2 (502). In particular,

TABLE I

| Parameters collected at a Central Unit WANN that are factors for RACH configurations in the Central Unit WANN or Distributed Unit WANN associated with the Central Unit WANN | Parameters collected at a Distributed Unit WANN that are factors for RACH configurations in the Distributed Unit WANN or Central Unit WANN associated with the Distributed Unit WANN |
|---|---|
| CU has copy from DU | cubic metric of preambles allocated to a cell |
| CU has copy from DU | whether the cell is in high-speed mode or not |
| CU has copy from DU | uplink (UL) and downlink (DL) imbalances |
| RACH load | N/A |
| N/A | the uplink inter-cell interference from the Physical Uplink Shared Channel (PUSCH) |
| uplink (UL) and supplementary uplink (SUL) imbalance | N/A |
| N/A | PUSCH load |
| User equipment (UE) measurement report (e.g., number of Preambles sent/tried) | N/A |

As can be seen from Table I, in the context of 5G wireless access networks, copies of some operational parameters collected at a distributed unit WANN may be also maintained at the corresponding central unit WANN. These parameters may include cubic metric of preambles allocated to a cell, a flag indicating whether a cell is in high-speed mode or not, and an uplink (UL) and downlink (DL) imbalance. Some parameters may be only collected and maintained at the central unit WANN. For example, RACH load for the central unit WANN and corresponding distributed unit WANNs may be only collected at the central unit WANN and may not be available locally at the distributed unit WANNs. Likewise, parameters such as the number of preamble tries in random access by user mobile stations (or user equipment, UE) may only be collected and available at the central unit WANN. Uplink (UL) and supplementary uplink (SUL) imbalance may be another parameter that is parameters that are collected locally at WANN1 (501) may be transmitted to WANN2 in step 1 (602). WANN2 may then perform RACH configuration optimization for WANN1 (501) based on the received parameters sent by WANN1 (501) and/or parameters collected locally at WANN2 (502) including optimized RACH configuration for WANN2. The optimized RACH configuration for WANN1 by WANN2 may then be transmitted by WANN2 to WANN1 in step 2 (604). WANN1 may then receive the optimized RACH configuration, broadcast the optimized RACH configuration, and follow the rest of the RACH request procedure as illustrated in FIGS. 4 and 5.

Figure 7:
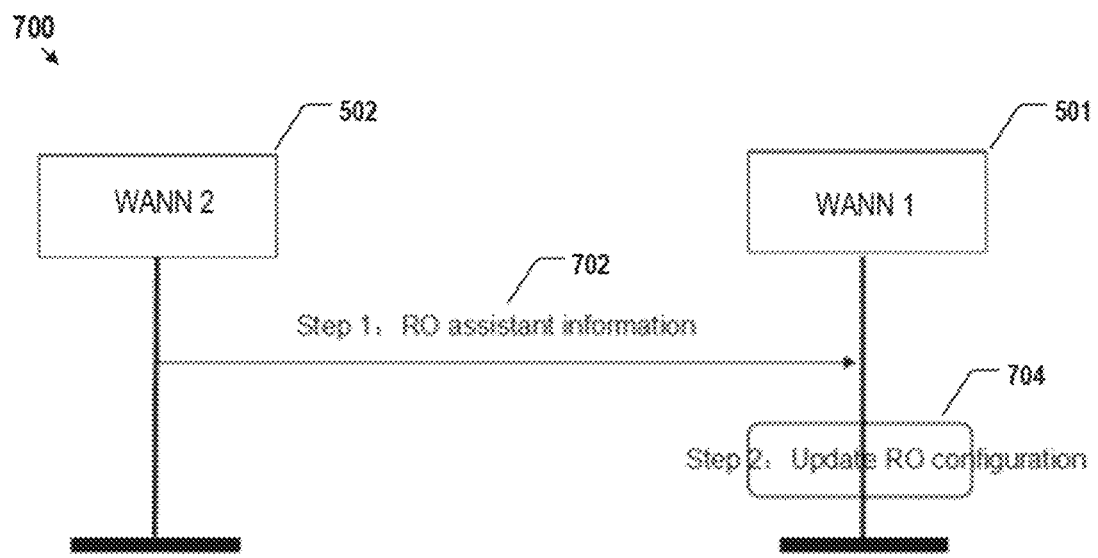
FIG. 7 shows another example of collaborative optimization of random access channel configuration involving two wireless access network nodes.

In a second example embodiment, as shown as 700 in FIG. 7, the RACH configuration optimization (RO) for WANN1 (501) may be performed by WANN1 (501) but in collaboration with WANN2 (502). In particular, parameters that are collected locally at WANN2 (502) labeled as "RO assistant information" (including operational parameters and/or optimized RACH configuration for WANN2) may be transmitted to WANN1 in step 1 (702). WANN1 (501) may then perform RACH configuration optimization for itself in step 2 (704) based on the received parameters or assistant information sent by WANN2 (502) and/or parameters collected locally at WANN1 (501). The optimized RACH configuration for WANN1 may then be broadcasted by WANN1 (501), followed by the rest of the RACH request procedure as illustrated in FIGS. 4 and 5.

Figure 8:
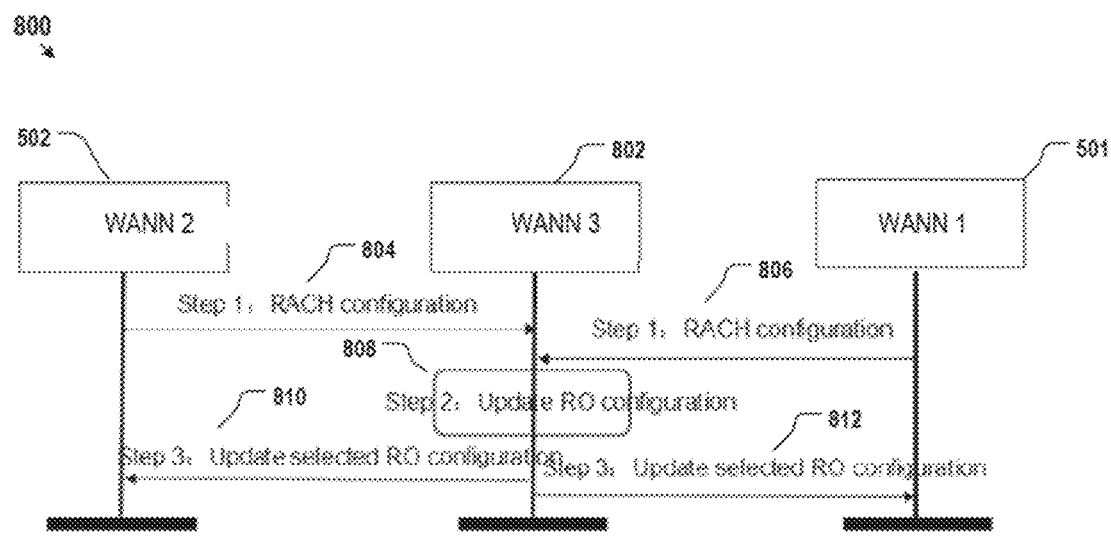
FIG. 8 shows an example of a collaborative optimization procedure for random access channel configuration in which two collaborating wireless access network nodes are in indirect communication with one another via a single intermediate wireless access network node.

In a third example embodiment, as shown as 800 in FIG. 8, the RACH configuration optimization (RO) for WANN1 (501) and WANN2 (502) may be performed by WANN3 (802). In particular, RACH configuration of WANN1 (501) and RACH configuration of WANN2 (502) may be transmitted to WANN3 (802), in step 806 and 804, respectively. Once the WANN3 receives the RACH configurations from WANN1 and WANN2, it may perform optimization of RACH configuration for any one or both of WANN1 and WANN2, based on the received RACH configurations of WANN1 and WANN2, and local parameters collected at WANN3 (802). The updated and optimized RACH configurations for WANN1 and WANN2 may then be transmitted by WANN3 to WANN1 and WANN2, in step 812 and 810 respectively. The updated and optimized RACH configuration for WANN1 may then be broadcasted by WANN1 (501), following the rest of the RACH request procedure as illustrated in FIGS. 4 and 5. Likewise, the updated and optimized RACH configuration for WANN2 may then be broadcasted by WANN2 (502), followed by the rest of the RACH request procedure as illustrated in FIGS. 4 and 5.

The embodiments of FIGS. 6 and 7 above, for example, may be applicable but are not limited to the situation where a 5G distributed unit WANN does not locally collect all the information that are useful for RACH configuration optimization and collaborative assistance may be provided by a the corresponding 5G central unit WANN.

Figure 9:
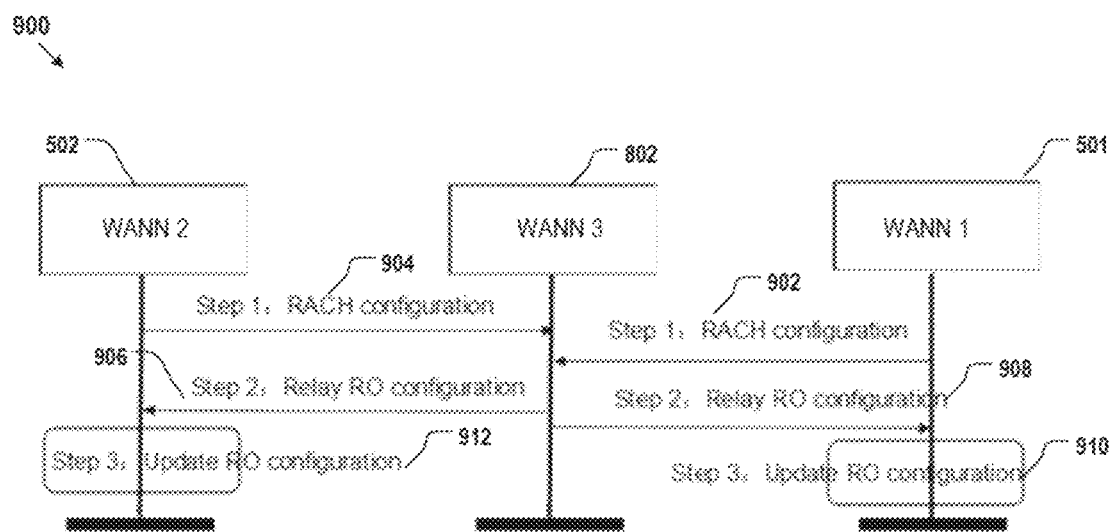
FIG. 9 shows another example of a collaborative optimization procedure for random access channel configuration in which two collaborating wireless access network nodes are in indirect communication with one another via a single intermediate wireless access network node.

In a fourth example embodiment, as shown as 900 in FIG. 9, the RACH configuration optimization (RO) for WANN1 (501) and WANN2 (502) may be performed by WANN1 (501 and WANN2 (502), respectively, but with assistance from WANN3 (802). In particular, RACH configuration of WANN1 (501) and RACH configuration of WANN2 (502) may be transmitted to WANN3 (802), in step 902 and 904, respectively. Once the WANN3 receives the RACH configurations from WANN1 and WANN2, it may relay the RACH configuration of WANN1 to WANN2, and RACH configuration of WANN2 to WANN1, as shown by step 902 and 908, respectively. Once WANN1 receives the relayed RACH configuration of WANN2, it may perform updating and optimization of its own RACH configuration, as shown in step 910, based on the received RACH configuration of WANN2, its own previous RACH configuration, and its current performance parameters. Likewise, once WANN2 receives the relayed RACH configuration of WANN1, it may perform updating and optimization of its own RACH configuration, as shown in step 912, based on the received RACH configuration of WANN1, its own previous RACH configuration, and its current performance parameters. The updated and optimized RACH configuration for WANN1 may then be broadcasted by WANN1, followed by the rest of the RACH request procedure as illustrated in FIGS. 4 and 5. Likewise, the updated and optimized RACH configuration for WANN2 may then be broadcasted by WANN2, followed by the rest of the RACH request procedure as illustrated in FIGS. 4 and 5.

In the embodiment of FIG. 9, when relaying the previous RACH configurations of WANN1 and WANN2 to one another (step 902 and 904), WANN3 may additionally transmit local operational parameters collected at WANN3 to WANN1 and WANN2 for consideration in the RACH configuration optimization in WANN1 and WANN2.

Figure 10:
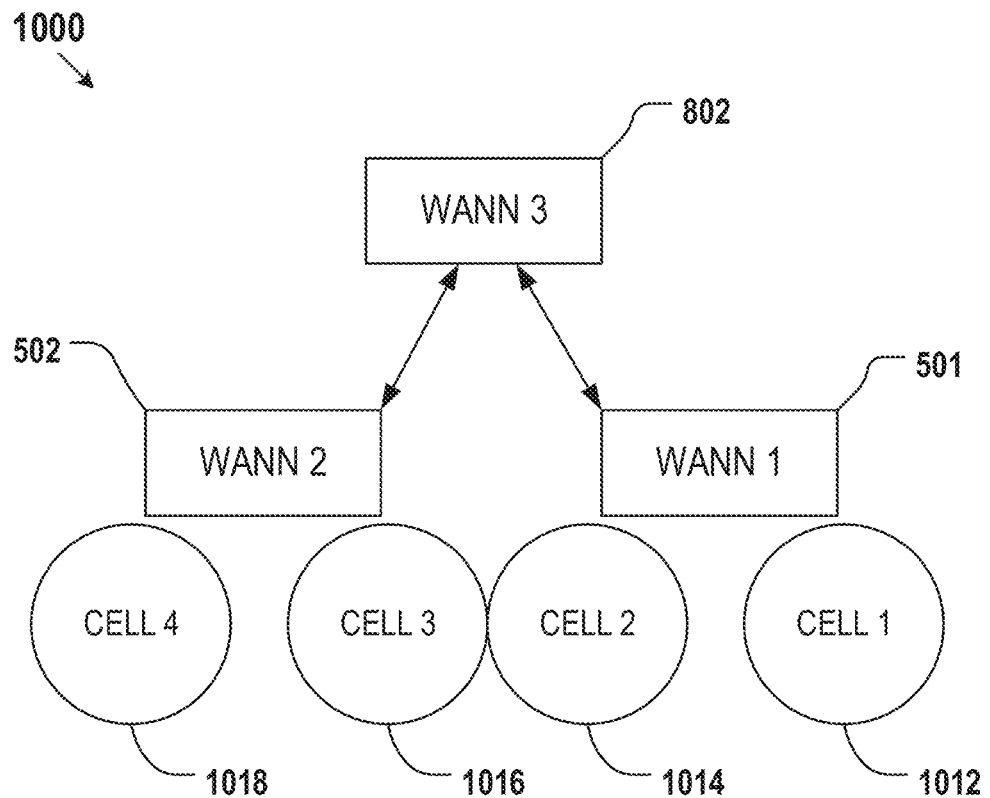
FIG. 10 shows an example of a network context for collaborative optimization of random access channel configuration in which two collaborating wireless access network nodes are in indirect communication with one another via a single intermediate wireless access network node.

The embodiments of FIGS. 8 and 9 above may be applicable but are not limited to the wireless network context illustrated in FIG. 10. As shown in FIG. 10, WANN1 (501) may be associated with cell 1 (1012) and cell 2 (1014) whereas WANN2 (502) may be associated with cell 3 (1016) and cell 4 (1018). Cell 2 and cell 3 may be adjacent and as such, operations pertaining to these cells may be coupled. For example, RACH configuration for cell 2 based on the parameter available at WANN1 may not be optimal since such RACH configuration may interfere or in conflict with the RACH configuration in neighboring cell 3 when the RACH configuration of cell 3 may also be determined based on local parameters at WANN2. In this situation, optimization of WANN1 and WANN2 may not be independent, and may be performed collaboratively. However, because WANN2 and WANN1 may not have a direct communication interface between them (for example, a distributed unit WANN may not support a direct communication interface with another distributed WANN in 5G wireless access networks), the parameter exchange between WANN1 and WANN2 may be performed via the intermediate WANN3 (802) (such as a central unit WANN in 5G wireless access networks).

Figure 11:
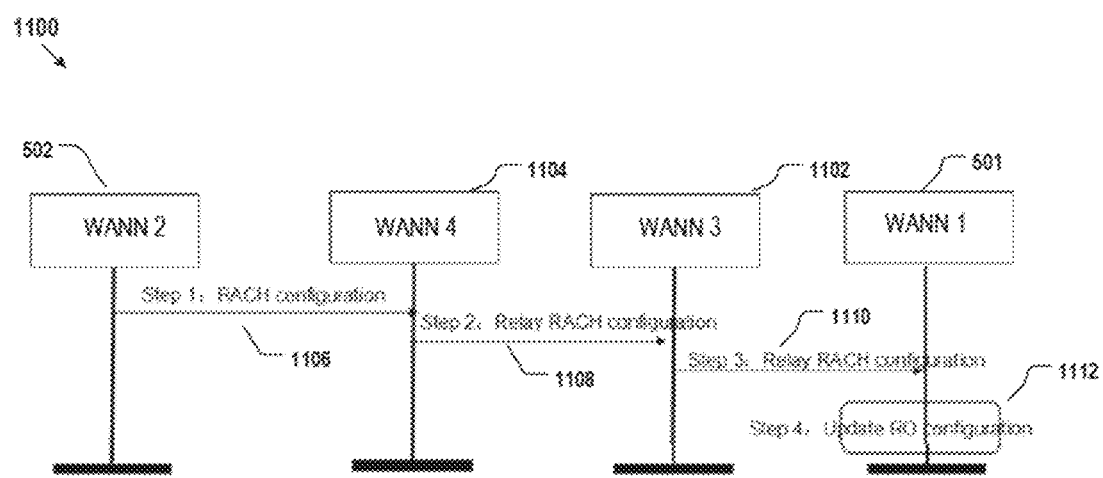
FIG. 11 shows an example of a collaborative optimization procedure for random access channel configuration in which two collaborating wireless access network nodes are in indirect communication via at least two intermediate wireless access network nodes.

In a fifth example embodiment, as shown as 1100 in FIG. 11, the RACH configuration optimization (RO) for WANN1 (501) may be performed by WANN1 (501) with the assistant information from WANN2 (502) relayed by a series of other WANNs, including but not limited to WANN3 (1102) and WANN4 (1104). For example, RACH configuration of WANN2 may be transmitted to WANN4 in step 1106. The RACH configuration of WANN2 may then be relayed by WANN4 to WANN3 in step 1108. The RACH configuration of WANN2 may be further relayed by WANN3 to WANN1 in step 1110. Once the RACH configuration of WANN2 is received at WANN1, WANN1 may then perform updating and optimization of its own RACH configuration, as shown in step 1112 based on the received RACH configuration of WANN2, its own previous RACH configuration, and its current performance parameters. The updated and optimized RACH configuration for WANN1 may then be broadcasted by WANN1, followed by the rest of the RACH request procedure as illustrated in FIGS. 4 and 5.

In the embodiments of FIG. 11, other additional parameters may be transmitted to WANN1 for the optimization of its RACH configuration. For example, local operational parameters at WANN2, WANN4, and/or WANN3 may be attached to the RACH configuration of WANN2 being relayed to WANN1. WANN1 may taking any of these parameters into consideration when performing updating and optimization of its own RACH configuration at step 1112.

Figure 12:
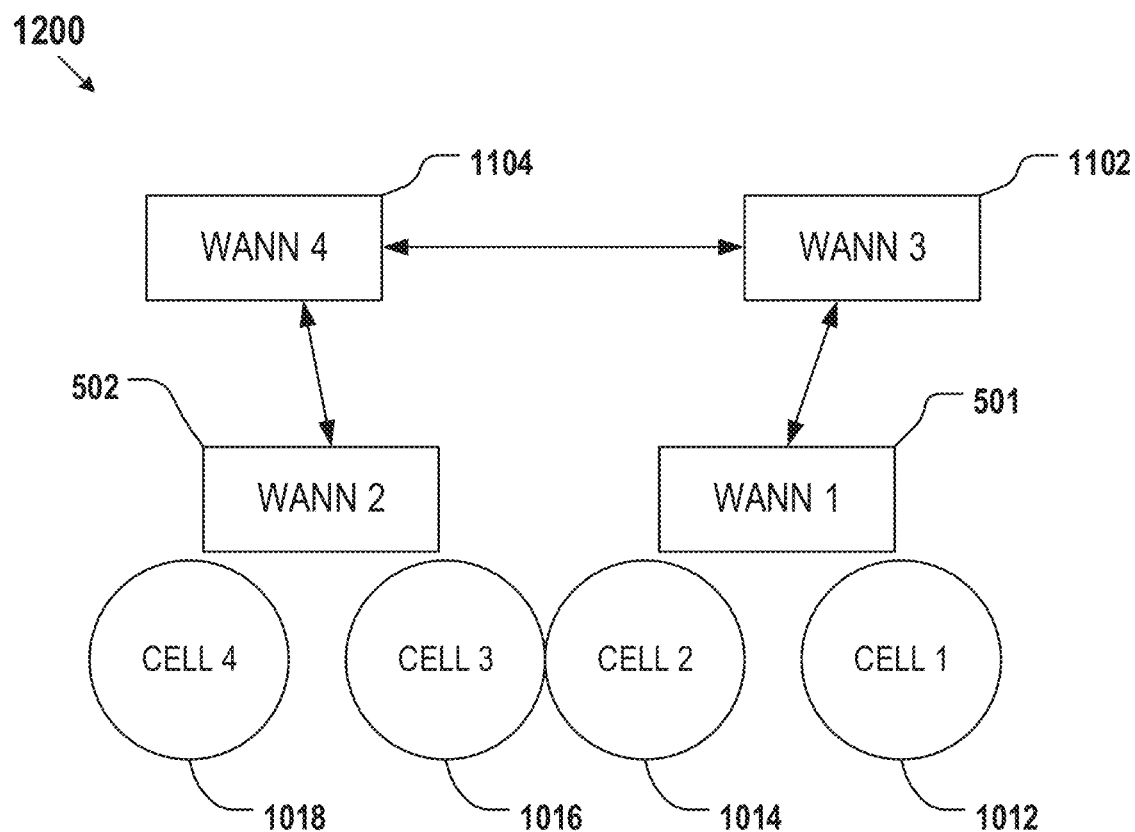
FIG. 12 shows an example of a network context for collaborative optimization of random access channel configuration in which two collaborating wireless access network nodes are in indirect communication via at least two intermediate wireless access network nodes.

The embodiment of FIG. 11 above may be applicable but is not limited to the wireless network context illustrated in FIG. 12. As shown in FIG. 12, WANN1 (501) may be associated with cell 1 (1012) and cell 2 (1014) whereas WANN2 (502) may be associated with cell 3 (1016) and cell 4 (1018). Cell 2 and cell 3 may be adjacent and as such, operations pertaining to these cells may be coupled. For example, RACH configuration for cell 2 based on the parameter available at WANN1 may not be optimal since such RACH configuration may interfere or in conflict with the RACH configuration in neighboring cell 3 when the RACH configuration of cell 3 may also be determined based on local parameters at WANN2. In this situation, optimization of WANN1 and WANN2 may not be independent, and may be performed collaboratively. However, because WANN2 and WANN1 may not have a direct communication interface between them (for example, a distributed unit WANN may not support a direct communication interface with another distributed WANN in 5G wireless access networks), the parameter exchange between WANN1 and WANN2 may need to be performed via some intermediate WANN. Further, because WANN1 and WANN2 may, for example, be 5G distributed unit WANNs that are associated with different central unit WANN3 and WANN4, respectively, they may only be able to indirectly communicate with on another using both WANN3 and WANN4 for relaying messages.

In some other embodiments, operational parameters such as those listed in Table I may be used for deriving one or more indicators indicative of the RACH resource usage. These indicators rather than the operational parameters may be transmitted among WANNs in the collaborative optimization of RACH configuration. These indicators for example may include but are not limited to cell operational indicator (cell information), beam or synchronization signal and physical broadcast channel information indicator, uplink or supplemental uplink information indicator, high-speed mode indicator. The derivation of these indicators may be performed by a particular WANN using local operational parameters and assistant parameters from other WANNs. The indicators may then be transmitted to a destination WANN for use in RACH configuration optimization. In some embodiments, the transmission of the indicators by a WANN may be controlled using thresholds. In other words, the transmission of an indicator may occur only when the indicator value is over a predetermined threshold value, indicating that RACH configuration may need to be optimized and updated. Such a scheme may prevent over messaging and network burden at the communication interfaces between the WANNs (such as the F1 interface between central unit WANNs and distributed unit WANNs in 5G wireless access networks). In some other embodiments, an aggregated RACH optimization or update indicator may be derived from the various operational data and transmitted among WANNs. In some other embodiments, the RACH indicators above and the actual operational parameters may be both transmitted among WANNs, when, for example, one or more indicators are above some predetermined threshold values.

In each of the embodiments above, the parameters being transmitted between WANNs may include and are not limited to RACH configurations, and any one or combination of physical uplink share channel usage data, physical uplink share channel interference data, cubic metric of random access preambles, high speed mode flag, uplink and downlink imbalance data, uplink and supplementary uplink imbalance data, random access channel load data, and number of random access preamble failure reported by mobile stations. In each of the embodiments above, each WANN may be but is not limited to a 4G LTE base station, a 5G NR base station, a 5G central-unit base station, or a 5G distributed-unit base station, a 5G core station or an application server. Further, in each of the embodiments above. Further, in each of the embodiments above, parameters may be transmitted between WANNs in form of messages using a communication interface including but not limited to F1, Xn, or NG communication interfaces and corresponding protocol stack. The communication interface of choice depends on the type of WANNs that are in communication with one another. In 5G wireless access networks, for example, a central unit WANN may communicate with another central unit WANN using the Xn interface; a distributed unit WANN may communicate with a central unit WANN using the F1 interface; and a central unit WANN may communicate with 5GC types of WANN using the NG interface.

In any of the embodiments described above, the communication of operation parameters or RACH configurations between the WANNs may be based on existing messaging mechanisms associated with the various communication interface described above. For example, communication from a central unit WANN to a distributed unit WANN may be carried by GNB-CU CONFIGURATION UPDATE message, UE CONTEXT MODIFICATION REQUIRED message and the like. For another example, communications from a distributed unit WANN to a central unit WANN may be carried by SETUP REQUEST message, GNB-DU CONFIGURATION UPDATE message, UE CONTEXT MODIFICATION REQUEST message, and the like. For another example, communication from one central unit WANN to another central unit WANN may be carried in XN SETUP message, NG-RAN NODE CONFIGURATION UPDATE message. The existing messaging format and protocol may be modified (by adding RACH configuration optimization fields) for carrying the RACH configuration and operational parameter data. Alternatively, other independent messaging protocol may also be used for communicating RACH configurations or operational parameters among WANNs. For example, specific RACH optimization assistant messages may be included in the definition of the various communication interface described above.

In any of the embodiments described above, the RACH configurations optimization may involve modifying various RACH parameters, preamble index configuration, size of RACH resources, and the like. RACH configuration may be broadcasted by a WANN in single or multiple messages. For example, RACH parameters in the configuration may be broadcasted separately. The RACH parameters may include but are not limited to RACH-ConfigCommon, RACH-ConfigDedicated, RACH-ConfigGeneric, PPREAMBLE BACKOFF, and the like. RACH configurations and parameters therein may be broadcasted use SIB 1 broadcast messages.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed by a first wireless access network node for providing random network access configuration to one or more mobile stations, comprising:
    receiving a message from a second wireless access network node comprising an indicator for updating random access channel configuration at the first wireless access network node;
    obtaining, based on the message, an optimized random access channel configuration for the first wireless access network node for reducing contention among the one or more mobile stations in obtaining network resource for random access to the first wireless access network node;
    broadcasting the optimized random access channel configuration optimized for the first wireless access network node to the one or more mobile stations; and
    receiving a random access request generated by one of the one or more mobile stations and transmitted according to transmission parameters selected from a plurality of transmission parameters indicated in the optimized random access channel configuration,
    wherein the indicator is generated by the second wireless access network node, and the message is sent by the second wireless access network node and received by the first wireless access network node in response to the indicator being higher than a predetermined threshold value; and
    wherein the indicator comprises an aggregation of any combination of flag for random access channel optimization, cell information, beam or synchronization signal and physical broadcast channel information, uplink or supplementary uplink information, or high speed mode support information.

2. The method of claim 1, wherein the message from the second wireless access network node comprises first data items pertaining to the second wireless access network node and wherein obtaining the optimized random access channel configuration for the first wireless access network node for reducing random access request contention among the one or more mobile stations comprises generating the optimized random access channel configuration based on both the first data items or second data items pertaining to the first wireless access network node.

3. The method of claim 2:
    wherein the first data items pertaining to the second wireless access network node comprise at least one of physical uplink share channel usage data, physical uplink share channel interference data, cubic metric of random access preambles, high speed mode flag, uplink and downlink imbalance data, uplink and supplementary uplink imbalance data, random access channel load data, and number of random access preamble failure reported by mobile stations; and
    wherein the second data items pertaining to the first wireless access network node comprise at least one of cubic metric of random access preambles, high speed mode flag, uplink and downlink imbalance data, uplink and supplementary uplink imbalance data, random access channel load data, and number of random access preamble failure reported by mobile stations.

4. The method of claim 1:
    wherein the message from the second wireless access network node comprises the optimized random access channel configuration for the first wireless access network node for reducing contention among the one or more mobile stations in obtaining network resource for random access to the first wireless access network node; and
    wherein obtaining the optimized random access channel configuration comprises extracting the optimized random access channel configuration from the message.

5. The method of claim 4, wherein the optimized random access channel configuration for the first wireless access network node is generated by the second wireless access network node based on first data items pertaining to the second wireless access network node or second data items pertaining to the first wireless access network node.

6. The method of claim 5, wherein before receiving the message from the second wireless access network node, the method further comprises sending, by the first wireless access network node, a pre-message containing the second data items pertaining to the first wireless access network node to the second wireless access network node.

7. The method of claim 1, wherein:
    the message comprises a random access channel configuration for the second wireless access network node or for another wireless access network node relayed by the second wireless access network node; and wherein obtaining the optimized random access channel configuration for the first wireless access network node comprises generating the optimized random access channel configuration for the first wireless access network node based on the random access channel configuration received from the second wireless access network node and data items pertaining to the first wireless access network node.

8. A wireless access network node comprising a processor and a memory, wherein the processor is configured to read computer code from the memory to implement a method of claim 1.

9. A computer program product comprising a non-transitory computer-readable program medium with computer code stored thereupon, the computer code, when executed by a processor, causing the processor to implement a method of claim 1.

10. A method performed by a first wireless access network node for assisting random network access channel configuration optimization of a second wireless access network node, comprising:
- generating a message comprising a dataset for random access channel configuration optimization for the second wireless access network node based on first data items pertaining to the first wireless access network node or based on the first data items and second data items pertaining to the second wireless access network node transmitted to the first wireless access network node; and
- transmitting the message to a third wireless access network node,
- wherein the dataset comprises one of:
  - an optimized random access channel configuration for the second wireless access network node;
  - supplemental data for obtaining an optimized random access channel configuration for the second wireless access network node;
  - an indicator for optimizing random access channel configuration for the second wireless access network node;
  - a random access channel configuration of the first wireless access network node; or
  - a random access channel configuration of a neighboring wireless access network node of the second wireless access network node relayed by the first wireless access network node;
- where the first data items comprise at least one of physical uplink share channel usage data, physical uplink share channel interference data, cubic metric of random access preambles, high speed mode flag, uplink and downlink imbalance data, uplink and supplementary uplink imbalance data, random access channel load data, and number of random access preamble failure reported by mobile stations; and
- wherein the second data items comprise at least one of cubic metric of random access preambles, high speed mode flag, uplink and downlink imbalance data, uplink and supplementary uplink imbalance data, random access channel load data, and number of random access preamble failure reported by mobile stations.

11. The method of claim 10, wherein:
the second wireless access network node and the third wireless access network node are a same wireless access network node;
the second wireless access network node and the third wireless access network node are separate wireless access network nodes and the third wireless access network node relays the message to the second wireless access network node; or
the second wireless access network node and the third wireless access network node are separate wireless access network nodes, and the third wireless access network node generate an optimized random access channel configuration for the second wireless access network node and transmitting the optimized random access channel configuration to the second wireless access network node.

12. The method of claim 11, wherein the third wireless access network node generates the optimized random access channel configuration for the second wireless access network node based on the message, and additionally based on first data items pertaining to the third wireless access network node, and/or second data items pertaining to and transmitted by the second wireless access network node and received at the third wireless access network node.

13. A method performed by a first wireless access network node for providing random network access configuration to one or more mobile stations in radio communication with a second wireless access network node and a third wireless access network node, comprising:
- receiving a first message from the second wireless access network node;
- receiving a second message from the third wireless access network node;
- generating a third message based on the first message and the second message for optimization of random access channel configuration for the second wireless access network node;
- generating a fourth message based on the first message and the second message for optimization of random access channel configuration for the third wireless access network node;
- transmitting the third message to the second wireless network access node to cause the second wireless network access node to update its random access channel configuration; and
- transmitting the fourth message to the third wireless network access node to cause the third wireless network access node to update its random access channel configuration.

14. The method of claim 13, wherein:
the first message comprises a first previous random access channel configuration of the second wireless access network node; and
the second message comprises a second previous random access channel configuration of the third wireless access network node.

15. The method of claim 14, wherein:
the third message comprises a relayed version of the second message by the first wireless access network node; and
the fourth message comprises a relayed version of the first message by the first wireless access network node.

16. The method of claim 13, further comprising generating, by the first wireless access network node, a third optimized random access channel configuration for the second wireless access network node and a fourth optimized random access channel configuration for the third wireless access network node, wherein the third message comprises the third optimized random access channel configuration and the fourth message comprises the fourth optimized random access channel configuration, and wherein the first wireless access network node generates the third optimized random access channel configuration and the fourth optimized random access channel configuration based on at least data items pertaining to neighboring cells associated with first second wireless access network node and the third wireless access network node.

\* \* \* \* \*